Patented Nov. 3, 1942

2,301,000

UNITED STATES PATENT OFFICE 2,301,000

SULPHANILYL ALKYL GUANIDINE AND PROCESS FOR MAKING IT

Philip Stanley Winnek, Riverside, Conn., assignor to American Cyanamid Company, New York, N. Y., a corporation of Maine No Drawing. Application April 18, 1941, Serial No. 389,172

12 Claims. (Cl. 260—397.7)

This invention relates to a new class of chemical compounds and methods for their preparation. More particularly it relates to sulphanilyl alkyl guanidines.

This new class of chemical compounds may be represented by the following general formula:

in which X represents amino or a substituted amino radical, such as alkylamino, arylamino, aralkylamino, and the like, or a radical convertible into an amino group including radicals such as nitro, acylamino, halogen, and azo radicals, G represents an alkyl guanidine radical and the acid addition salts of such compounds.

The structural formula for the sulphanilyl alkyl guanidines is probably as follows

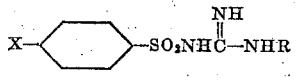

in which X represents one of the radicals indicated in the general formula and R is an alkyl group.

While the above structure is probably the correct one, the compounds may have one of the following structures and I do not wish to limit my invention by designating any particular structural formula.

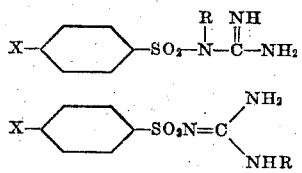

In these structural formulae X and R represent the same radicals as pointed out previously.

Some of the compounds of this invention are bacteriostatic and hence may be used as chemotherapeutic agents. They may also be used as intermediates for the preparation of other compounds, such as pharmaceuticals and particularly azo dyestuffs.

In general the compounds of the present invention may be prepared by reacting a p-substituted benzenesulphonyl halide with an alkyl guanidine having at least one reactive hydrogen, in which the p-substituent is a radical convertible into an amino group including those such as nitro, acylamino, halogen and azo radicals. These reaction products may then be converted into the compounds of the general formula in which X is an amino group by hydrolysis of the acylamino group, by reduction of the nitro and azo groups, or by reaction of the halogen group with ammonia. Preferably the reaction between the alkyl guanidine and the sulphonyl halide is one in which a reaction medium employing an organic liquid, such as acetone, isopropyl alcohol, tertiary butyl alcohol, dioxane, or the like, is used. In this reaction a hydrogen halide is liberated and in some instances it may be desirable to provide a basic reaction medium which will unite with the hydrogen halide evolved. This may be effected by carrying out the reaction in a suitable medium and adding an excess of sodium hydroxide or other alkali hydroxide or in some instances the reaction may be carried out in the presence of a basic reaction medium, such as pyridine, in which case it is not necessary to add the sodium hydroxide.

The invention will be described in greater detail in conjunction with the following specific examples, which however, are merely illustrative of the preferred methods of preparing representative compounds of the class and are not intended to limit the scope of the invention. The parts are by weight except in the case of liquids which are expressed in corresponding parts by volume.

EXAMPLE 1

*Preparation of N⁴-acetylsulphanilyl butyl guanidine*

Four parts of butyl guanidine sulphate were suspended in 30 parts of acetone and 2.5 parts of sodium hydroxide dissolved in seven parts of water were added. The mixture was cooled to 15° C. and 6.5 parts of N⁴-acetylsulphanilyl chloride were added gradually with stirring and with the temperature kept between 15°–20° C. Stirring was continued two hours and the acetone which evaporated was replaced. The temperature was allowed to rise to 25° C. Eight volumes of water were added and the crude N⁴-acetylsulphanilyl butyl guanidine separated. It was filtered off, washed with water, and purified by crystallization from a dilute alcohol solution.

In place of acetone, isopropyl alcohol, tertiary butyl alcohol or dioxane may be used as reaction media.

EXAMPLE 2

*Sulphanilyl butyl guanidine*

Three parts of N⁴-acetylsulphanilyl butyl guanidine were suspended in 12 parts of 3N hydrochloric acid and the mixture heated to boiling. After boiling five minutes, all the solid material was not in solution and two parts of 12N hydrochloric acid and 10 parts of alcohol were added and the mixture boiled for 10 minutes. The solution was cooled and filtered and the filtrate neutralized with sodium hydroxide solution in the cold. The crude sulphanilyl butyl guanidine precipitated as a slightly pink solid. It was purified by crystallization from dilute alcohol using decolorizing charcoal to remove color.

EXAMPLE 3
$N^4$-acetylsulphanilyl ethyl guanidine 13.6 parts of ethyl guanidine sulphate were suspended in 120 parts of acetone and 10 parts of sodium hydroxide dissolved in 20 parts of water were added. The mixture was cooled to 20° C. and 25 parts of $N^4$-acetylsulphanilyl chloride were added gradually with stirring and with the temperature maintained between 18°–23° C. The mixture was stirred for six hours, neutralized with acetic acid and allowed to stand overnight. The precipitate of $N^4$-acetylsulphanilyl ethyl guanidine which separated from the reaction mixture was filtered off and washed with alcohol and ether.

EXAMPLE 4
Sulphanilyl ethyl guanidine

Twenty-three parts of $N^4$-acetylsulphanilyl ethyl guanidine were suspended in 63 parts of 4N hydrochloric acid and the mixture heated on a hot plate. The solid material soon dissolved and the solution was boiled gently for four minutes. It was then diluted immediately with an equal volume of ice and the cold solution stirred with decolorizing charcoal for fifteen minutes. The mixture was filtered and the filtrate neutralized with sodium hydroxide solution. The sulphanilyl ethyl guanidine separated as a white solid. It was purified by crystallization from hot water.

EXAMPLE 5
$N^4$-acetylsulphanilyl propyl guanidine

Fifteen parts of propyl guanidine sulphate were suspended in 120 parts of acetone and 10 parts of sodium hydroxide dissolved in 20 parts of water were added. The mixture was cooled to 20° C. and 25 parts of acetylsulphanilyl chloride were added gradually with stirring and with the temperature maintained between 18°–22° C. The reaction mixture was stirred four hours and allowed to stand twelve hours at room temperature. It was then neutralized with acetic acid and the $N^4$-acetylsulphanilyl propyl guanidine which had precipitated was filtered off and washed with water.

EXAMPLE 6
Sulphanilyl propyl guanidine

Nine parts of $N^4$-acetylsulphanilyl propyl guanidine were suspended in 21 parts of 4N hydrochloric acid and the mixture was heated on a hot plate. When the solid had dissolved the solution was boiled gently for two minutes and then diluted with an equal volume of ice. The cold solution was stirred for one-half hour with decolorizing charcoal and filtered. The filtrate was neutralized in the cold with sodium hydroxide solution. The sulphanilyl propyl guanidine precipitated as a tarry material which turned solid on standing in the cold. It was purified by crystallization from water. The pure sulphanilyl-propyl guanidine is a white crystalline material.

EXAMPLE 7
$N^4$-acetylsulphanilyl amyl guanidine

Eighteen parts of amyl guanidine sulphate were suspended in 120 parts of acetone and 10 parts of sodium hydroxide dissolved in 20 parts of water were added. The mixture was cooled to 20° C. and 25 parts of acetyl sulphanilyl chloride were added gradually with stirring and with the temperature maintained between 18°–22° C. The reaction mixture was stirred four hours and allowed to stand twelve hours at room temperature. It was then neutralized with acetic acid and the $N^4$-acetylsulphanilyl amyl guanidine which had precipitated was filtered off and washed with water.

EXAMPLE 8
Sulphanilyl amyl guanidine

Seven parts of $N^4$-acetylsulphanilyl amyl guanidine were suspended in 15 parts of 4N hydrochloric acid and the mixture heated on a hot plate. When the solid had dissolved the solution was boiled gently for two minutes and then diluted with two volumes of ice. The cold solution was stirred for one-half hour with decolorizing charcoal and filtered. The filtrate was neutralized in the cold with sodium hydroxide solution. The sulphanilyl amyl guanidine precipitated as a tarry material which turned solid on standing in the cold. It was purified by crystallization from dilute alcohol using activated charcoal to remove impurities. The pure sulphanilyl amyl guanidine is a white crystalline material.

In the above examples the p-acetylaminobenzenesulphonyl chloride was used in carrying out the reaction. The acetyl compound is preferred because of its cheapness and availability. However, it is to be understood that other acyl compounds may be used including those such as propionyl, butyryl, benzoyl, nicotinyl, and the like. Similarly, instead of p-acetylaminobenzenesulphonyl chloride the corresponding p-acetylaminobenzenesulphonyl bromide may be used.

In Examples 1, 3, 5, and 7 p-nitrobenzenesulphonyl chloride may be used instead of the p-acetylamino compound, in which instances the corresponding p-nitrobenzenesulphonyl alkyl guanidines are obtained. The p-nitro compounds thus obtained may be reduced to the p-amino compounds by any one of several reduction methods well known in the art.

Alkyl guanidines generally may be employed for producing these new compounds, and the invention is not limited to those alkyl guanidines employed in the examples. The alkyl guanidines which may be employed therefore include any alkyl derivative of guanidine whether derived from lower alkane paraffin hydrocarbons or higher alkane paraffin hydrocarbons, so long as they have at least one group which will react with a sulphanyl halide. The preferred ones are the lower alkyl derivatives, such as those illustrated in the examples, that is to say, ethyl, propyl, butyl, and amyl. The less desirable ones are the higher alkyl derivatives such as the hexyl, heptyl, octyl, decyl, undecyl, dodecyl, and the like. The mono-alkyl guanidines are likewise preferred; it should be understood, however, that the di- or tri-alkyl guanidines may be employed providing they still have a hydrogen capable of reacting with the sulphanyl halide.

The sulphanilyl alkyl guanidines will react readily with any inorganic or organic acid to form addition salts therewith. The ordinary inorganic acid addition salts such as the hydrochlorides, sulphates, phosphates, chlorates, and the like, may be prepared by adding the sulphanilyl alkyl guanidine to a relatively strong aqueous solution of the acid. The salts produced by such reactions may be very conveniently recovered by diluting the aqueous solution with an organic solvent such as acetone and collecting the resulting precipitate by filtration. The acid addition salts of the water soluble organic acids, for example, acetic, lacetic, mandelic, and the like, may be prepared as described in the processes above and in other cases the acid addition salts may be prepared by a method in which a relatively water insoluble organic acid, such as benzoic, is dissolved in an organic solvent, for example, ethyl alcohol, and the sulphanilyl alkyl guanidine added to this solution. The salt may then be recovered from the solution by any convenient means, as for example, by evaporating the solution to dryness. It is readily seen, therefore, that the present invention relates to and includes any inorganic acid salt or any organic acid salt of the various sulphanilyl alkyl guanidines. The organic acid salts may be those produced from saturated or unsaturated carboxylic acids, saturated or unsaturated hydroxy carboxylic acids, as well as halogenated or other substituted or unsubstituted acids of the aliphatic, alicyclic, aromatic, or heterocyclic series. Preferably the salts are those produced from relatively non-toxic organic acids or those having some bactericidal or other therapeutic property including acids such as acetic, salicyclic, mandelic, lactic, nicotinyl, p-aminobenzoic, and the like.

The above description and examples are intended to be illustrative only. Any modification or variation therefrom which conforms to the spirit of the invention is intended to be included within the scope of the claims.

What I claim is:

1. A compound of the group consisting of those represented by the following formula, carboxylic and inorganic acid addition salts thereof:

in which X is a member of the group consisting of amino radicals, radicals hydrolyzable to an amino group and radicals reducible to an amino group, and G is an alkyl guanidine radical.

2. A compound represented by the following formula:

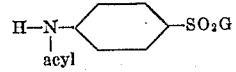

in which G is an alkyl guanidine radical and in which acyl is a carboxylic acid acyl radical.

3. A compound represented by the following formula:

in which G is an alkyl guanidine radical.

4. A compound represented by the following formula:

in which G is an alkyl guanidine radical.

5. A compound represented by the following formula:

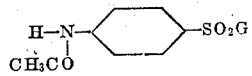

in which G is an alkyl guanidine radical.

6. Sulphanilyl butyl guanidine.

7. The process which comprises reacting an alkyl guanidine with a p-acetylaminobenzenesulphonyl halide.

8. The process which comprises reacting an alkyl guanidine with a p-acetylaminobenzenesulphonyl halide, separating the resulting reaction product and removing the acetyl group by hydrolysis.

9. The process of producing sulphanilyl alkyl guanidines which comprises reacting an alkyl guanidine with p-acetylaminobenzenesulphonyl chloride and hydrolyzing the resulting acetyl compound to the amino compound.

10. The process of producing sulphanilyl butyl guanidine which comprises reacting butyl guanidine with p-acetylaminobenzenesulphonyl chloride and removing the acetyl group by hydrolysis.

11. The process of producing sulphanilyl propyl guanidine which comprises reacting propyl guanidine with p-acetylaminobenzenesulphonyl chloride and removing the acetyl group by hydrolysis.

12. The process of producing sulphanilyl ethyl guanidine which comprises reacting ethyl guanidine with p-acetylaminobenzenesulphonyl chloride and removing the acetyl group by hydrolysis.

PHILIP STANLEY WINNEK.